Patented May 18, 1926.

1,585,042

UNITED STATES PATENT OFFICE.

MATTHEW D. MANN, JR., OF ROSELLE, AND ROBERT B. LEBO, OF ELIZABETH, NEW JERSEY, ASSIGNORS TO SETH B. HUNT, TRUSTEE, OF MOUNT KISCO, NEW YORK.

ART OF PURIFYING AND DEODORIZING ISOPROPYL ALCOHOL.

No Drawing.   Application filed October 27, 1921. Serial No. 510,820.

The present invention relates to the purification and deodorization of isopropyl alcohol and will be fully understood from the following description thereof.

Isopropyl alcohol, particularly when produced by sulfation of the propylene content of hydrocarbon gases and subsequent hydrolysis and redistillation, has a penetrating foreign odor due to impurities therein, the most objectionable of which are probably sulfur compounds present in minute amounts, the nature of which has not yet been determined. This foreign odor persists even on redistillation. In accordance with the present invention the alcohol may be purified and these odors substantially removed by means of a reactive metallic chloride having the properties of mercuric chloride and zinc chloride. The compounds of this group appear to have in common the property of inducing oxidation in the presence of oxidizable substances.

The purification of the alcohol is effected by the intimate admixture therewith of a small proportion of the reactive metallic chloride, from 1 to 7 pounds of the chloride material to 1,000 gallons of the alcohol being ordinarily a satisfactory proportion. The mixture is allowed to stand, preferably without heating, for 10 to 12 hours or longer, the purification being in general more complete the longer the mixture is allowed to stand. The separation of the purified alcohol may suitably be effected by distillation.

In some cases the purifying action of the reactive metallic chloride may be improved by an intermediate finishing step prior to the redistillation of the purified alcohol. For example, the mixture may be made alkaline by the use of a suitable non-volatile alkaline reagent, for example, sodium hydroxide, the proportion employed being suitably varied in accordance with the proportion of metallic chloride used. Thus it has been found satisfactory to employ about 2 gallons of 14 to 15° Bé. sodium hydroxide solution for each pound of metallic chloride used. After the addition of the alakline reagent, the alcohol is redistilled. In other cases it has been found desirable to employ as an intermediate finishing step prior to distillation, a treatment with an active halogen supplying material, such as bleaching powder, bleaching solution, bromine or the like. A very small proportion of halogen is all that need be supplied in this manner, from 1 to 5 pounds of chlorine per 1,000 gallons or the equivalent of other halogens being in general sufficient.

The present invention will be more clearly understood from the following specific examples illustrative thereof.

*Example No. 1.*

5 lbs. of mercuric chloride are dissolved in water to form an approximately saturated solution, which is added to and thoroughly mixed with 1,500 gallons of isopropyl alcohol (91%). The mixture is allowed to stand for 10 to 12 hours at least, and preferably for 2 to 3 days. The alcohol may then be distilled off. If desired, prior to the distillation of the alcohol, 10 gallons of 14 to 15° Bé. sodium hydroxide solution may be added to the mixture and thoroughly agitated therewith. Some mercuric oxide is precipitated and the liquid is rendered alkaline. The alcohol may then be distilled off.

*Example No. 2.*

20 pounds of commercial zinc chloride are added to 4,000 gallons of isopropyl alcohol (91%) and the mixture stirred and allowed to stand, preferably for 2 or 3 days. The alcohol may then be distilled off and will be found to be deodorized and purified to a marked degree. Before redistillation the mixture may be treated by either of the two following methods, if desired.

(1) Sufficient sodium hydroxide may be added to the mixture to make it alkaline, say 5 to 10 gallons of 14° Bé. sodium hydroxide solution per 1,000 gallons of alcohol, and the alcohol may then be distilled off.

(2) A small proportion of active halogen-yielding material may be added to the alcohol-zinc chloride mixture; say, for example, 5 to 10 pounds of bleach for each 1,000 gallons of alcohol. It is preferred that the mixture be allowed to stand for a short while, say one hour or so, after the halogen-yielding material is added. The purified alcohol is then distilled off.

As the nature of the impurities in the isopropyl alcohol, and particularly those which impart to it its foreign odor, are not now clearly understood, the particular course of treatment pursued with any given batch of isopropyl alcohol must be determined experimentally upon a small proportion thereof. With some batches of alcohol, it will be found that the treatment with the reactive metallic chloride alone is sufficient. With other batches it will be found that either the after treatment with alkali or with halogen-yielding material gives improved results, the specific treatment being chosen which is found experimentally to produce the most highly purified and deodorized alcohol.

It has also been found that the present process is applicable to the purification of other higher alcohols (containing more than two carbon atoms), such as amyl alcohol, particularly when derived from the olefines of cracked petroleum products.

We claim:

1. The method of purifying and deodorizing higher alcohols which comprises contacting the alcohol with a reactive metallic chloride of the hereinbefore described group comprising zinc and mercuric chloride.

2. The process of purifying and deodorizing higher alcohols which comprises contacting the alcohol with a reactive metallic chloride of the hereinbefore described group comprising zinc and mercuric chloride and adding to the mixture an active halogen yielding material.

3. The process of purifying and deodorizing isopropyl alcohol which comprises contacting the alcohol with a reactive metallic chloride of the hereinbefore described group comprising zinc and mercuric chloride and subsequently making the mixture alkaline with a non-volatile alkaline material.

4. The process of purifying and deodorizing isopropyl alcohol which comprises admixing therewith from 1 to 7 pounds of zinc chloride per 1,000 gallons of the alcohol, allowing the mixture to stand and removing the alcohol.

5. The process of purifying isopropyl alcohol which comprises mixing therewith 5 pounds of zinc chloride to 1,000 gallons of the alcohol, permitting the mixture to stand, subsequently adding 5 to 10 gallons of 14 to 15° Bé. sodium hydroxide solution per 1,000 gallons of alcohol and removing the alcohol.

6. The process of purifying and deodorizing isopropyl alcohol which comprises mixing therewith 1 to 5 pounds of zinc chloride per 1,000 gallons of the alcohol, permitting the mixture to stand, adding 5 to 10 pounds of bleach per 1,000 gallons of alcohol and distilling off the alcohol.

MATTHEW D. MANN, Jr.
ROBERT B. LEBO.